(12) United States Patent
Choi

(10) Patent No.: US 11,636,148 B2
(45) Date of Patent: Apr. 25, 2023

(54) METHOD, SYSTEM, AND NON-TRANSITORY COMPUTER READABLE RECORD MEDIUM FOR PROVIDING COMPARISON RESULT BY COMPARING COMMON FEATURES OF PRODUCTS

(71) Applicant: LINE Plus Corporation, Seongnam-si (KR)

(72) Inventor: Yei Won Choi, Seongnam-si (KR)

(73) Assignee: LINE Plus Cornoration, Seongnam-si (KR)

( * ) Notice: Subject to any disclaimer, the term of this patent is extended or adjusted under 35 U.S.C. 154(b) by 0 days.

(21) Appl. No.: 17/204,454

(22) Filed: Mar. 17, 2021

(65) Prior Publication Data
US 2021/0303617 A1   Sep. 30, 2021

(30) Foreign Application Priority Data
Mar. 24, 2020   (KR) .................. 10-2020-0035570

(51) Int. Cl.
| G06F 16/583 | (2019.01) |
| G06F 16/58 | (2019.01) |
| G06F 16/535 | (2019.01) |
| G06F 16/538 | (2019.01) |
| G06F 16/9535 | (2019.01) |
| G06V 30/148 | (2022.01) |
| G06V 30/10 | (2022.01) |

(52) U.S. Cl.
CPC ........ *G06F 16/5854* (2019.01); *G06F 16/535* (2019.01); *G06F 16/538* (2019.01); *G06F 16/5846* (2019.01); *G06F 16/5866* (2019.01); *G06F 16/9535* (2019.01); *G06V 30/153* (2022.01); *G06V 30/10* (2022.01)

(58) Field of Classification Search
None
See application file for complete search history.

(56) References Cited

U.S. PATENT DOCUMENTS

| 10,204,136 | B2 * | 2/2019 | Moore | G06F 3/04847 |
| 11,270,367 | B2 * | 3/2022 | Abdollahian | G06Q 30/0282 |
| 2016/0162971 | A1 * | 6/2016 | Peterson | G06Q 30/0627 705/26.63 |
| 2019/0012717 | A1 * | 1/2019 | Han | G06Q 30/0643 |

FOREIGN PATENT DOCUMENTS

KR   10-2032038 B1   10/2019

\* cited by examiner

*Primary Examiner* — Giuseppi Giuliani
(74) *Attorney, Agent, or Firm* — Sughrue Mion, PLLC

(57) ABSTRACT

Provided are a method, a system, and a non-transitory computer-readable record medium for comparing common features of products and providing a comparison result. A product comparison method includes recognizing at least two comparable products from at least one image; displaying at least one common attribute of the at least two comparable products through a user interface; and based on the user interface receiving a user input that selects one of the at least one common attribute, as a selected attribute, providing a result of comparison between the at least two comparable products with regard to the selected attribute.

20 Claims, 10 Drawing Sheets

METHOD, SYSTEM, AND NON-TRANSITORY COMPUTER READABLE RECORD MEDIUM FOR PROVIDING COMPARISON RESULT BY COMPARING COMMON FEATURES OF PRODUCTS

CROSS-REFERENCE TO RELATED APPLICATION

This claims priority under 35 U.S.C. § 119 to Korean Patent Application No. 10-2020-0035570, filed Mar. 24, 2020 in the Korean Intellectual Property Office (KIPO), the disclosure of which is incorporated herein by reference in its entirety.

BACKGROUND

1. Field

Apparatuses and methods consistent with example embodiments relate to providing a result of comparing products through a user interface.

2. Description of Related Art

A general method used for a product search displays products for a user through a classification by attribute based on product information that is input as a text. The method relates to keyword-based image search technology and requires users to directly verify products in all categories. Many users have difficulty inputting a proper keyword for a search when knowledge about a product is insufficient, which may lead to a poor product search result.

SUMMARY

One or more example embodiments provide a method and an apparatus for comparing data of the same attribute between at least two products recognized in an image and displaying a comparison result through labeling of the comparison result on the corresponding image.

Further, one or more example embodiments provide a method and an apparatus for providing common features capable of comparing at least two products recognized in an image through a user interface and marking a comparison result about a feature selected through the user interface on the corresponding image.

According to an aspect of at least one example embodiment, there is provided a product comparison method implemented by a computer apparatus including at least one processor, wherein the product comparison method may include: recognizing at least two comparable products from at least one image; displaying at least one common attribute of the at least two comparable products through a user interface; and based on the user interface receiving a user input that selects one of the at least one common attribute, as a selected attribute, providing a result of comparison between the at least two comparable products with regard to the selected attribute.

The displaying may include identifying the common attribute of the at least two comparable products based on metadata of the at least two comparable products.

The displaying may include: retrieving metadata of the at least two comparable products from a product database that stores product information; and identifying the common attribute of the at least two comparable products based on the retrieved metadata.

The displaying may include: retrieving metadata from product details acquired through a real-time search for the at least two comparable products; and identifying the common attribute of the at least two comparable products based on the retrieved metadata.

The displaying may include: identifying field values of the at least two comparable products with regard to the common attribute.

The providing the result of the comparison may include: marking a graphic object corresponding to one of the at least two comparable products with a label according to the result of the comparison by overlaying the label on the at least one image.

The marking may include differentially displaying the label based on a field value of at least one of the at least two comparable products about the selected attribute.

The providing may include providing the result of the comparison in a graph form based on field values of the at least two comparable products with regard to the selected attribute.

The recognizing the at least two comparable products may include: providing product information of each of a plurality of objects that are recognized in the at least one image; and setting at least two objects of the plurality of objects as the at least two comparable products in response to a user input that confirms the product information of the at least two objects.

The at least two comparable products may include a first product and a second product, and wherein the production comparison method may include: extracting from the at least one image, first text corresponding to the first product and second text corresponding to the second product, through an optical character reader (OCR); and comparing the first text with the second text to provide the result of the comparison.

According to an aspect of another example embodiment, there is provided a non-transitory computer-readable record medium storing instructions that, when executed by the at least one processor, cause the at least one processor to perform the product comparison method.

According to an aspect of another example embodiment, there is provided a computer apparatus including: at least one memory configured to store computer-readable instructions; and at least one processor configured to execute the computer-readable instructions to: recognize at least two comparable products from at least one image; provide at least one common attribute of the at least two comparable products through a user interface; and add a label in the at least one image based on a result of comparison between the at least two comparable products with regard to a selected attribute that is selected through the user interface from the at least one common attribute.

The at least one processor may be further configured to execute the computer-readable instructions to: identify the common attribute of the at least two comparable products based on metadata of the at least two comparable products.

The at least one processor may be further configured to execute the computer-readable instructions to: retrieve metadata of the at least two comparable products from a product database, and identify the common attribute of the at least two comparable products based on the retrieved metadata.

The at least one processor may be further configured to execute the computer-readable instructions to: retrieve metadata from product details acquired through a real-time search for the at least two comparable products; and identify the common attribute of the at least two comparable products based on the retrieved metadata.

The at least one processor is further configured to execute the computer-readable instructions to: identify field values of the at least two comparable products with regard to the common attribute.

The at least one processor may be further configured to execute the computer-readable instructions to: differentially display the label based on a field value of at least one of the at least two comparable products about the selected attribute.

The at least one processor may be further configured to execute the computer-readable instructions to: provide the result of the at least two comparable products in a graph form based on field values of the at least two comparable products about the selected attribute.

The at least one processor may be further configured to execute the computer-readable instructions to: provide product information of each of a plurality of objects that are recognized in the at least one image, and set at least two objects of the plurality of objects as the at least two comparable products in response to a user input that confirms the product information of the at least two objects.

The least two comparable products may include a first product and a second product, and wherein the at least one processor may be further configured to execute the computer-readable instructions to: extract from the at least one image, first text corresponding to the first product and second text corresponding to the second product, through an optical character reader (OCR); and compare the first text with the second text to provide the result of the comparison.

BRIEF DESCRIPTION OF THE FIGURES

The above and/or other aspects will be more apparent by describing certain example embodiments, with reference to the accompanying drawings, in which.

DETAILED DESCRIPTION

Figure 1:
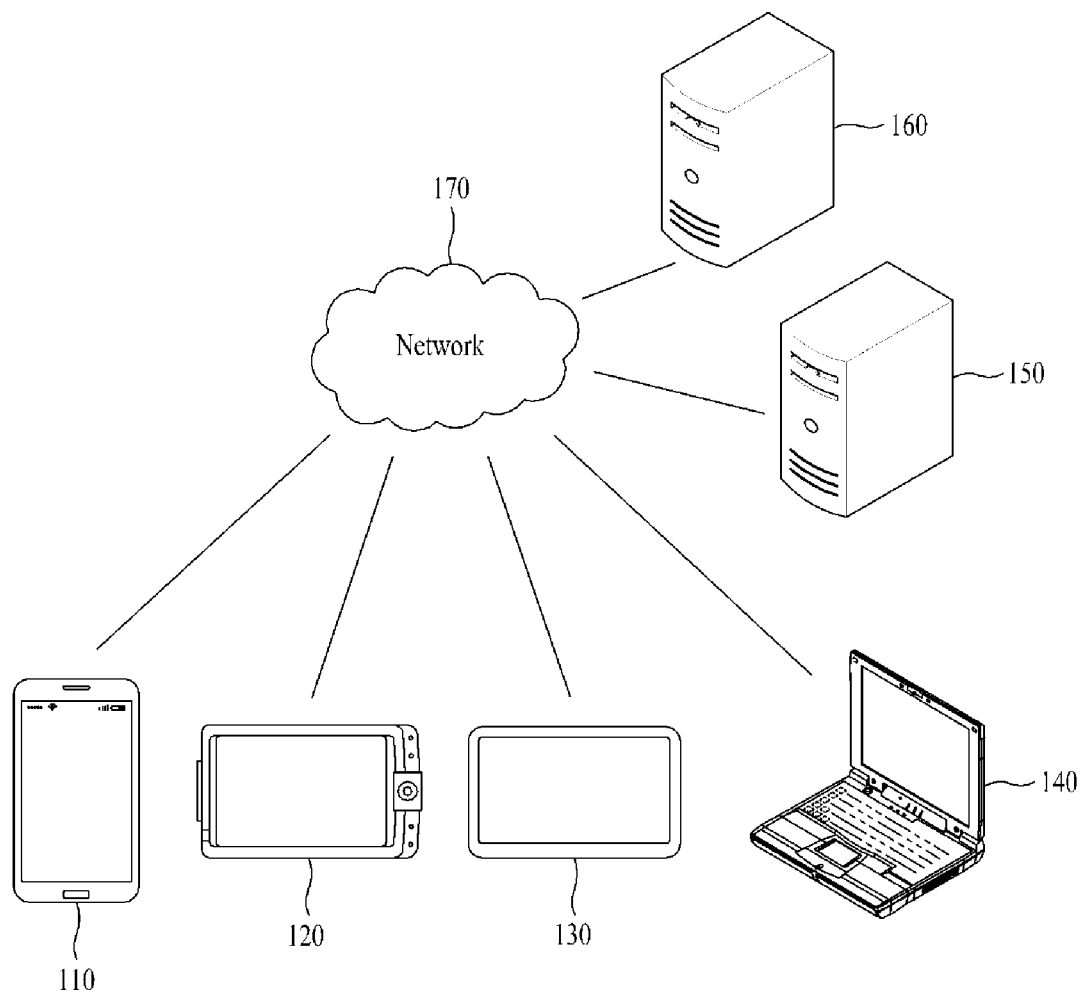
FIG. 1 is a diagram illustrating an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to forward and/or distribute the computer programs, program code, instructions, or some combination thereof, over a network. The remote computing system may forward and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for comparing products of the same attribute included in an image.

The example embodiments including the disclosures described herein may compare data of the same attribute between at least two products recognized in an image and may label a comparison result on the corresponding image.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, and the like, through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, for example, the server 150 may provide, as the first service, a service (e.g., a product comparison service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
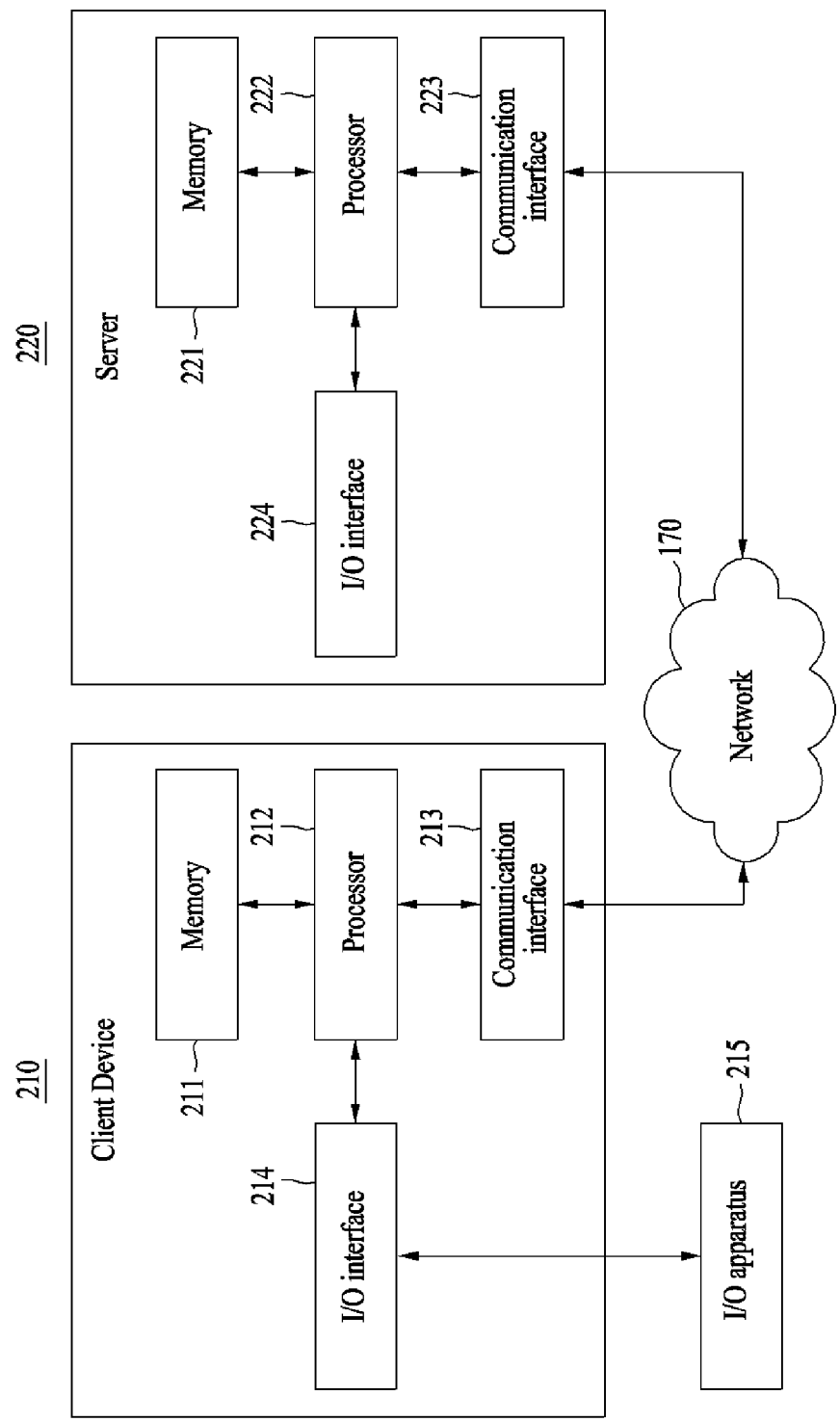
FIG. 2 is a diagram illustrating an example of an electronic device and a server according to at least one example embodiment.

FIG. 2 is a block diagram illustrating an example of a client device 210 and a server 220 according to example embodiments. The client device 210 may correspond to any of the electronic devices 110, 120, 130, and 140 shown in FIG. 1, and the server 220 may correspond to any of the servers 150 and 160 shown in FIG. 1.

Referring to FIG. 2, the client device 210 may include a memory 211, a processor 212, a communication interface 213, and an input/output (I/O) interface 214, and the server 220 may include a memory 221, a processor 222, a communication interface 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the client device 210 or the server 220 as a permanent storage device separate from the memory 211, 221. Also, an OS or at least one program code, for example, a code for a browser installed and executed on the client device 210 or an application installed and executed on the client device 210 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication interface 213, 223, instead of the non-transitory computer-readable record medium. For example, at least one program may be loaded to the memory 211 of the client device 210 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication interface 213, 223 to the processor 212, 222. For example, the processor 212, 222 may be configured to execute received instructions in response to the program code stored in the storage device, such as the memory 211, 221.

The communication interface 213, 223 may provide a function for communication between the client device 210 and the server 220 over the network 170 and may provide a function for communication between the client device 210 and another client device, or another server, and between the server 220 and another client device or server. For example, the processor 212 of the client device 210 may forward a request created based on a program code stored in the storage device such as the memory 211, to the server 220 over the network 170 under control of the communication interface 213. The client device 210 may receive a control signal, an instruction, content, a file, etc., from the processor 222 of the server 220 through the communication module 213 of the client device 210. For example, a control signal, an instruction, content, a file, etc., of the server 220 received through the communication interface 213 may be forwarded to the processor 212 or the memory 211, and content, a file, etc., may be stored in a storage medium, for example, the permanent storage device, further includable in the client device 210.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the client device 210. Also, the I/O interface 224 of the server 220 may be a device for interface with an apparatus for input or output that may be connected to the server 220 or included in the server 220. In detail, when the processor 212 of the client device 210 processes an instruction of a computer program loaded to the memory 211, content or a service screen configured based on data provided from the server 220 or the electronic device 120 may be displayed on the display through the I/O interface 214.

According to other example embodiments, the client device 210 and the server 220 may include a number of components greater than or less than a number of components shown in FIG. 2. However, there is no need to clearly illustrate many components according to the related art. For example, the client device 210 may include at least a portion of the I/O apparatus 215, or may further include other components, for example, a transceiver, a global positioning system (GPS) module, a camera, a variety of sensors, a database (DB), and the like. In detail, if the client device 210 is a smartphone, the client device 210 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, example embodiments of a method and system for comparing common features of products and providing a comparison result are described.

Figure 3:
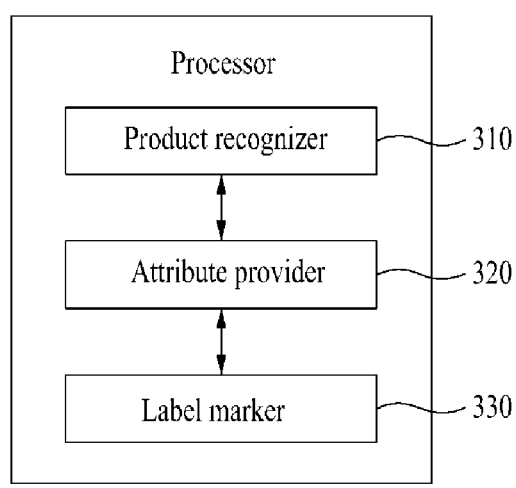
FIG. 3 is a diagram illustrating an example of components includable in a processor of an electronic device according to at least one example embodiment.
Figure 4:
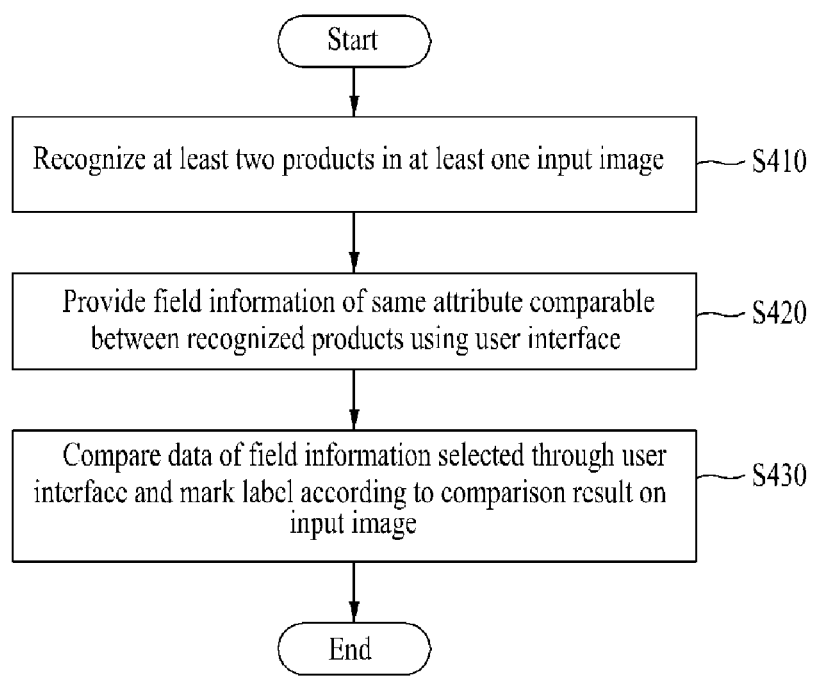
FIG. 4 is a flowchart illustrating an example of a method performed by an electronic device according to at least one example embodiment.

FIG. 3 is a diagram illustrating an example of components includable in a processor of an electronic device according to at least one example embodiment, or a processor of a server according to another example embodiment. FIG. 4 is a flowchart illustrating an example of a method performed by an electronic device according to at least one example embodiment.

A computer-implemented product comparison system may be configured in the client device 210 according to the example embodiment. For example, the product comparison system may be configured as a program form that independently operates or may be configured as an in-app form of a specific application to be operable on the specific application and may provide a product comparison service through interaction with the server 220.

The product comparison system implemented in the client device 210 may perform a product comparison method of FIG. 4 based on an instruction provided from the application installed on the client device 210.

Referring to FIG. 3, to perform the product comparison method of FIG. 4, the processor 212 of the client device 210 may include a product recognizer 310, an attribute provider 320, and a label marker 330. Depending on example embodiments, the components of the processor 212 may be selectively included in or excluded from the processor 212. Also, depending on example embodiments, the components of the processor 212 may be separated or merged for representations of functions of the processor 212.

The processor 212 and the components of the processor 212 may control the client device 210 to perform operations S410 to S430 of the product comparison method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 based on an instruction provided from the program code stored in the client device 210, for example, an instruction provided from an application executed on the client device 210. For example, the product recognizer 310 may be used as a functional representation of the processor 212 that controls the client device 210 to recognize a product in an image in response to the instruction.

The processor 212 may read a instruction from the memory 211 to control the client device 210. In this case, the read instruction may include an instruction for controlling the processor 212 to perform the following operations S410 to S430.

Referring to FIG. 4, in operation S410, the product recognizer 310 may recognize at least two products in at least one input image. The product recognizer 310 may receive an image that includes a product to be compared with another product, using an application having an artificial intelligence (AI)-based camera function. For example, the product recognizer 310 may receive an image through a camera capturing function of the application or may retrieve an image from an image storage space related to the client device 210, for example, a local storage device such as the memory 211 and an Internet storage space linkable to the client device 210.

For example, the product recognizer 310 may receive an image that includes at least two products to be compared in a single frame. As another example, the product recognizer 310 may receive a corresponding product image one by one for each product through a plurality of operations. For example, in response to entering a product comparison mode, the product recognizer 310 may provide an interface for capturing images of products to be captured one by one or retrieving the images from a storage space. The recognized products may be displayed on areas separated for the respective products. When a single image input or retrieved from the storage device includes at least two products, each of the products may be separately displayed.

Herein, comparable products may represent objects having a common feature comparable between products as objects having an attribute that provides an image comparison analysis. For example, the comparable products may include cosmetics, medicines, dietary supplements (e.g., vitamins, minerals, etc.), wines, sports shoes, mobile phones, and home appliances. They are provided as examples only and any mutually comparable common classifiable targets may be included. Although sub-categories of the comparable products differ, products labelled based on different criteria such as purposes may also apply.

The product recognizer 310 may analyze an input image based on deep learning-based object detection technology and may specify products to be compared based on an analysis result. For example, to provide a product comparison service through interaction with the server 220, the product recognizer 310 may provide product information that matches a corresponding object for each of objects recognized in the input image using a pre-constructed product database, for example, the memory 221. The product recognizer 310 may transfer a product information request that includes the input image to the server 220, and in response to the product information request, the server 220 may provide product information that matches each of the objects recognized in the input image. The product recognizer 310 may display product information that matches a corresponding object for each of the objects recognized in the input image and may specify products to be compared based on a user input on the product information. For example, in response to an input of an image from the user, the product recognizer 310 may display product information that matches each of objects recognized in the corresponding image and may request a user confirmation regarding whether the recognized objects are targets desired to be compared and, in response to an input of the user confirmation on the product information, may specify the corresponding products as products to be compared.

In operation S420, the attribute provider 320 may provide field information of the same attribute comparable between the products recognized in operation S410 using a user interface (hereinafter, referred to as an attribute selection user interface). When at least two comparable products are specified, the attribute provider 320 may verify at least one attribute capable of commonly grouping the comparable products and a user interface that allows a user selection on the verified attribute.

The attribute provider 320 may retrieve metadata of each product for each of the comparable products. The metadata represents data that describes various attributes of a corresponding product, and may include product specifications, such as, for example, a category, a product classification item, a usage, capacity, component, a country of manufacture, a manufacturer, a salesperson, a manufactured date, and an expiration date, and may also include product features, such as, for example, efficacy or performance, evaluation data and various tags about a product, and the like. A common classifiable attribute of comparable products may refer to a criterion capable of grouping the comparable products into a common attribute based on metadata. The attribute provider 320 may verify whether the comparable products have a metadata field corresponding to the same attribute. For example, when the comparable products are cosmetics, the attribute provider 320 may compare metadata of the respective products, and if an attribute field representing a sense of moisture and an attribute field representing a whitening performance are commonly present, may use the sense of moisture and the whitening performance as common classifiable attributes. Also, the attribute provider 320 may verify whether a field value corresponding to a metadata field is present and whether the metadata field has a comparable numerical value. For example, when a database including refined metadata is constructed in advance, the attribute provider 320 may retrieve metadata of each of the comparable products by referring to the database. For example, metadata for each product may be included in a product database. As another example, the attribute provider 320 may retrieve metadata from details information about at least one product included in a result of retrieving comparable products through a real-time search based on product information specified from the comparable products. For example, the attribute provider 320 may retrieve metadata of the comparable products by extracting product details displayed at a top in the result of retrieving the comparable products. A mapping table about various detailed expressions may be predefined to verify a metadata field from various unrefined products details in various forms. The attribute provider 320 may refer to metadata values of the comparable products from the product details acquired through the real-time search by referring to the mapping table.

The attribute provider 320 may extract field information of the same attribute between the comparable products and may verify a numerical value representing a corresponding field value for each piece of field information. Here, the attribute provider 320 may group comparable individual field information between the comparable products into a common concept and may provide each piece of field information through a corresponding user interface. For example, the attribute provider 320 may extract field information having a largest field depth or a predetermined (or, alternatively, desired) number of pieces of field information in descending order of depths from among metadata fields of the same attribute between the comparable products, and may verify a field value, for example, a numerical value, for each piece of the extracted field information. As another example, a field depth to be compared may be adjusted in response to a request from the user. A further detailed or abstract comparison may be performed between products by adjusting a level of comparison.

In operation S430, in response to a selection on a specific field through the attribute selection user interface, the label marker 330 may compare data of the selected field information and may mark a label according to a comparison result on the input image. The label marker 330 may compare data of the same attribute of the comparable products and may display the comparison result to be overlaid on the input image. Here, the label marker 330 may display labeling on a product of the input image based on the comparison result. Here, a display element, such as a size or a color of the label according to the comparison result may be differentially applied based on a numerical value representing a field value.

As another example, the label marker 330 may provide a comparison result between the comparable products in a graph form and may generate a numerical value representing a field value for each of the comparable products as a graph and may mark the comparison result on the graph.

Although it is described that metadata fields of the same attribute of the comparable products are compared, it is provided as an example only and any common feature comparable between the products may be used. For example, the processor 212 may use a character recognition result using an optical character reader (OCR). That is, the processor 212 may extract texts from the input image using the OCR for each comparable product, may compare numerical values included in the extracted texts and may mark a label according to a comparison result. In addition to metadata of the comparable products, label information of products recognizable through the OCR may be compared. Also, metadata and an OCR recognition result of the comparable products may be combined. All the information included in the product details may be used as product comparison data. For example, in a case in which the comparable products are multivitamin supplements, the processor 212 may extract text describing supplement facts (e.g., an amount of vitamin A, an amount of vitamin C, and an amount of vitamin D) from labels attached to or printed on the containers of the multivitamin supplements, from the image displaying the multivitamin supplements.

Also, when a preset specific attribute, for example, an attribute preset by a user, is present in the metadata field or the OCR-based character recognition result of the comparable products, the processor 212 may display a product including the specific attribute to be highlighted. For example, when a hazardous component, an allergic component, or a non-preferred component the user desires to identify is present in the comparable products, the processor 212 may mark a separate label or marker on a product in which the corresponding component is present. Also, when a text representing the hazardous component, the allergic component, or the non-preferred component the user desires to identify is extracted through an OCR-based character recognition for a product, the processor 212 may also display the corresponding product with a comparison result with another product.

The server 220 may construct in advance a database about metadata fields based on refined metadata. The processor 222 of the server 220 may receive an input of product classification and field information through the I/O interface 224 and may store the product classification and field information in a database. Additionally or alternatively, the processor 222 of the server 220 may analyze data collected through the network 170, may determine a field name and a field depth for each product classification and may store the determined field name ad field depth in the database as shown in Table 1.

TABLE 1

| Product classification | Product sub-classification | Field name | Field depth |
| --- | --- | --- | --- |
| Cosmetics | Cream | Moisturizing | 1 |
| Cosmetics | Cream | Sense of moisture | 2 |
| Cosmetics | Cream | With or without fragrance | 1 |
| Cosmetics | Perfume | Target gender | 1 |
| Cosmetics | Perfume | Main fragrance | 1 |
| Cosmetics | Perfume | Base note | 2 |
| Cosmetics | Perfume | Top note | 2 |

The pre-constructed database about the metadata fields may be reused to collect and refine metadata. For example, when a perfume A and a perfume B are recognized through the product recognizer 310, the attribute provider 320 may extract "Target gender" and "Main fragrance" each having a field depth of "1" as field information by referring to the database of Table 1. Here, if the two perfumes, the perfume A and the perfume B, have the same "Target gender" and "Main fragrance", the attribute provider 320 may extract "Base node" and "Top node" each having a field depth of "2" as field information and may determine a field value corresponding to each of the perfume A and the perfume B based on metadata of the perfume A and the perfume B. Here, a label may be determined in association with the determined field value and the determined label may be marked on the input image by the label marker 330.

FIGS. 5 to 10 illustrate examples of a user interface screen for describing a process of providing a product comparison service according to at least one example embodiment.

FIGS. 5 to 10 illustrate examples of a product comparison service screen 500, which may be displayed on a display of the client device 210.

Figure 5:
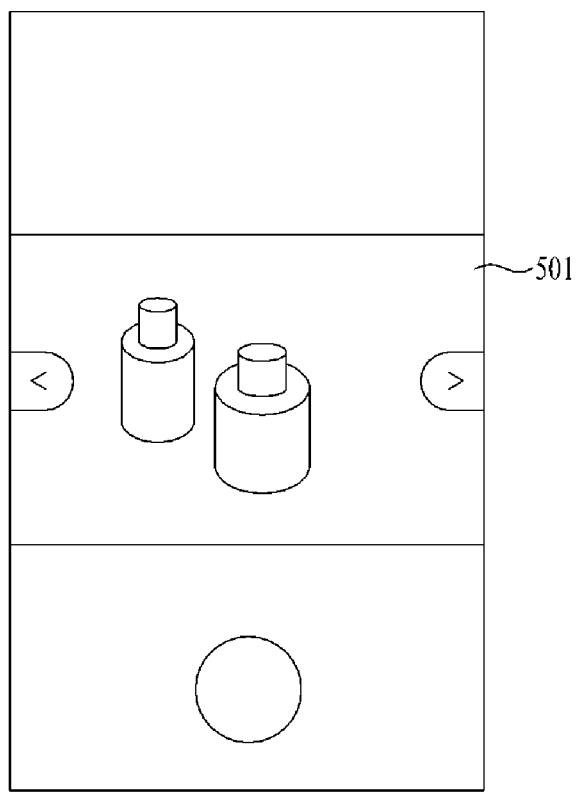
FIG. 5 illustrates an example of a process of inputting an image of products to be compared according to at least one example embodiment.

Referring to FIG. 5, the processor 212 may receive an image 501 through a camera capturing function or may retrieve the image 501 from an image storage space associated with the client device 210 to display the image 501 on the product comparison service screen 500. Here, the processor 212 may receive the image 501 as an image in which at least two comparable products are captured in a single frame or may receive a plurality of separate images in which the comparable products are respectively included.

For example, a user may capture two cleansing products in a single frame to compare the two cleansing products. Here, the processor 212 may receive a captured image as the image 501 for product comparison.

The processor 212 may display product information that matches a corresponding object for each of objects recognized in the image 501 and may specify comparable products based on a user input on the product information.

Figure 6:
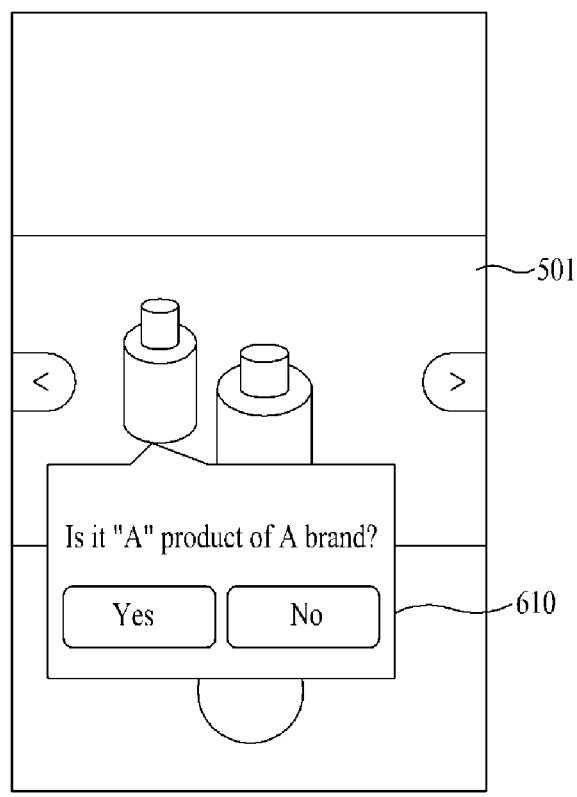
FIGS. 6 and 7 illustrate examples of a process of specifying products to be compared according to at least one example embodiment.
Figure 7:
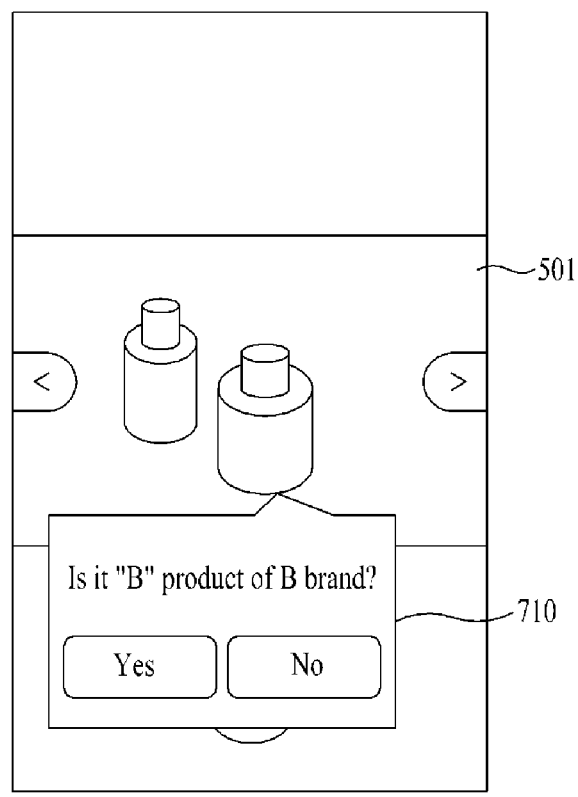

Referring to FIGS. 6 and 7, the processor 212 may provide user confirmation screens 610 and 710 each including product information that matches a corresponding object for each of the objects recognized in the image 501. When a single product is recognized as "A" product of A brand and the other product is recognized as "B" product of B brand in the image 501, the processor 212 may provide the user confirmation screens 610 and 710 each including corresponding information to enable a user confirmation regarding whether the recognized products are correct. In response to an input of the user confirmation about the products recognized through the user confirmation screens 610 and 710, the processor 212 may specify the recognized products as products to be compared.

Depending on example embodiments, a process of providing the user confirmation screens 610 and 710 about the product information recognized in the image 501 may be omitted. For example, if a product recognition accuracy is greater than or equal to a desired or preset level, a process of providing the user confirmation screens 610 and 710 may be omitted.

The processor 212 may retrieve metadata for each of the products to be compared and may verify whether a metadata field of the same attribute is present between the comparable products and whether the corresponding metadata field has a comparable numerical value. Here, the processor 212 may extract field information of the same attribute of the comparable products. For example, an attribute having a common feature, such as a sense of moisture (or moist information), a number of hazardous components (or a hazardous index), and an overall rating, may be extracted from metadata for each of the "A" product and the "B" product. The processor 212 may verify or identify a field value of the same attribute of the comparable products. For example, for comparison between the "A" product and the "B" product, the processor 212 may verify or identify a field value of the same attribute of the products, such as a sense of moisture ("A" product~5 points, "B" product~3 points), a number of hazardous components ("A" product~2, "B" product~1), and an overall rating ("A" product~10 points, "B" product~5 points).

Figure 8:
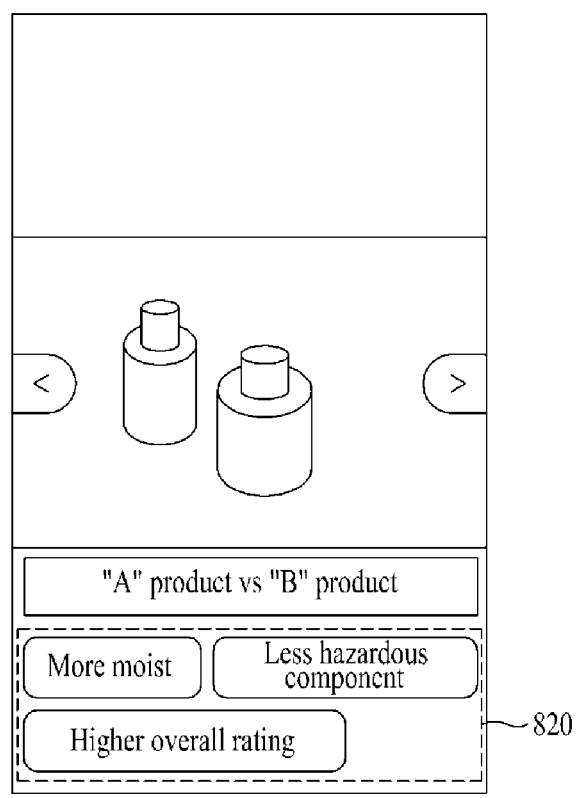
FIG. 8 illustrates an example of a process of displaying comparable field information between products to be compared according to at least one example embodiment.

Referring to FIG. 8, the processor 212 may provide an attribute selection user interface 820 based on field information of the same attribute of comparable products That is, the processor 212 may group individual field values representing a common feature as a common concept and may provide the grouped field values using the attribute selection user interface 820. When an "A" product and a "B" product have common field information in metadata, such as, for example, moisture (or moist information), a number of hazardous components (or a hazard indicator), and an overall rating, the processor 212 may provide an attribute selection user interface 820 based on the corresponding field information.

Figure 9:
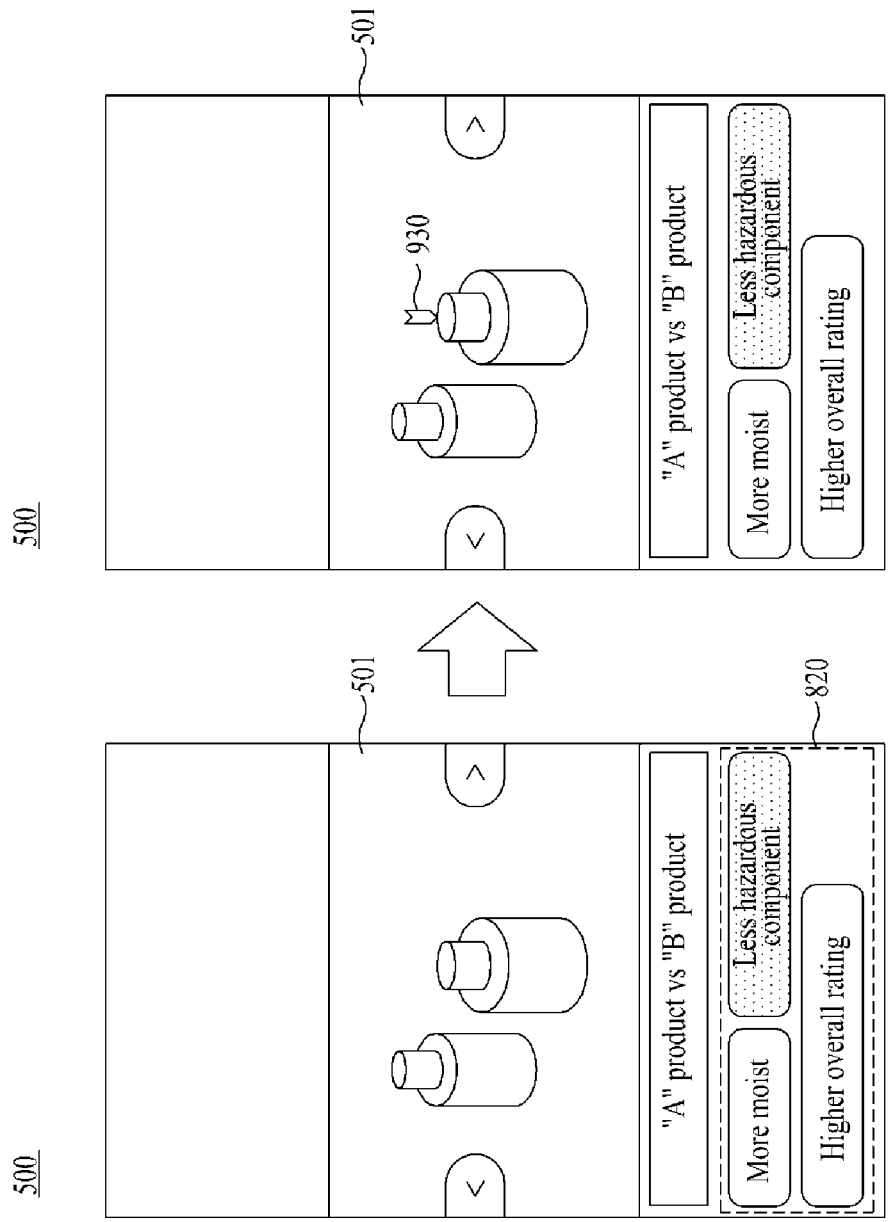
FIGS. 9 and 10 illustrate examples of a process of providing a comparison result between products to be compared according to at least one example embodiment.

Referring to FIG. 9, in response to a selection on a field of a specific attribute through the attribute selection user interface 820, the processor 212 may compare numerical values of the selected field and may mark a label 930 according to a comparison result on the image 501. In response to a selection on a user interface corresponding to "Less hazardous component" in the attribute selection user interface 820, the processor 212 may compare numerical values of a field associated with "Hazardous component" among metadata attributes of the "A" product" and the "B" product and may mark the label 930 on a product corresponding to a smallest hazardous component. Alternatively, the processor 212 may provide ranking information for each of the comparable products instead of marking the label 930 according to the comparison result. For example, the processor 212 may display a ranking of each product in descending order of field values related to "Hazardous component."

Figure 10:
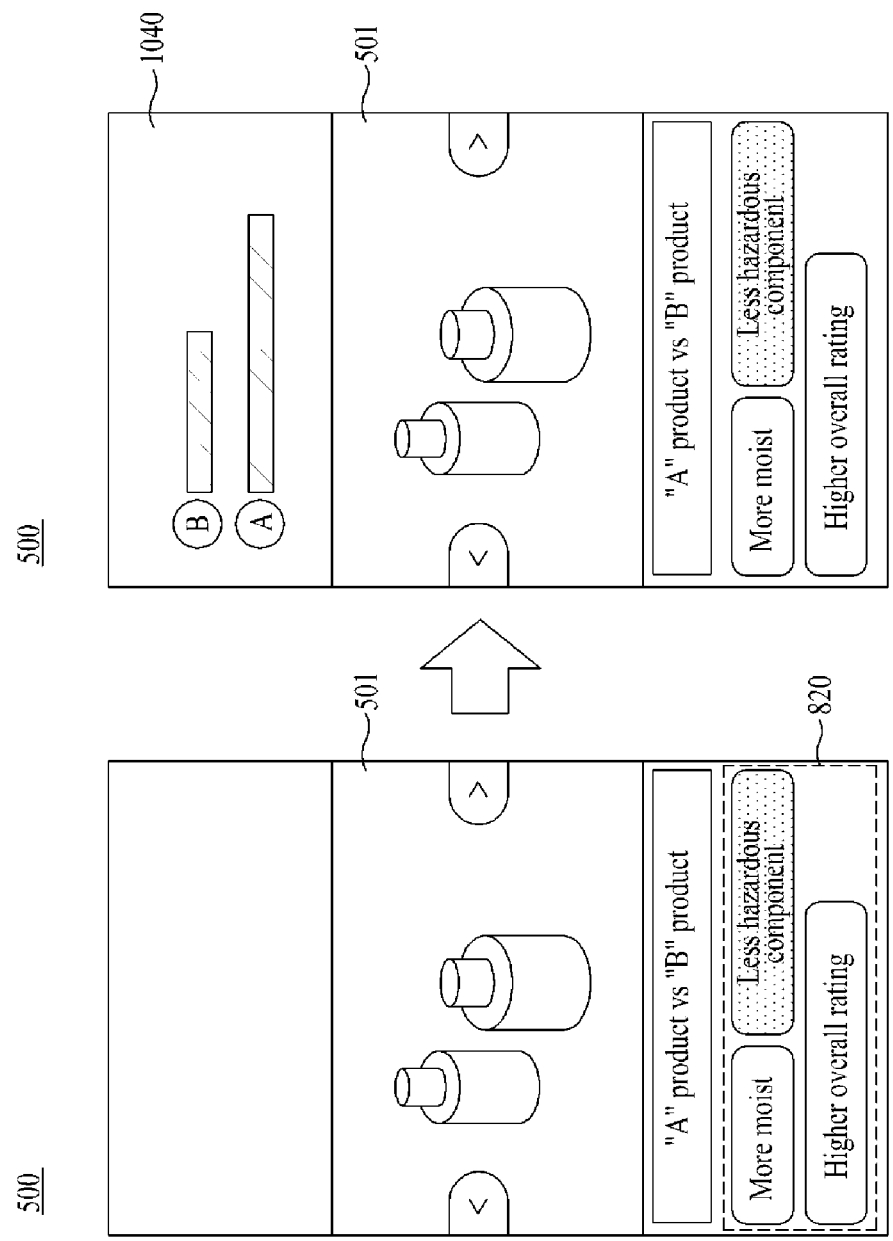

As another example, the processor 212 may provide the comparison result of the comparable products in a graph form instead of providing the label 930 according to the comparison result. Referring to FIG. 10, in response to a selection on the user interface corresponding to "Less hazardous component" in the attribute selection user interface 820, the processor 212 may provide the comparison result that represents field values related to "Hazardous component" among metadata attributes of the "A" product and the "B" product as a graph 1040. In the graph 1040, the ratio between the length of a first bar representing the field value of the "A" product and the length of a second bar representing the second value of the B" product may be proportional to the ratio between the field value of the "A" product and the field value of the "B" product.

Therefore, according to some example embodiments, it is possible to display comparable common attributes between products and to mark a result of comparing field values of an attribute selected by a user through labeling with respect to at least two products to be compared.

According to some example embodiments, it is possible to compare data of the same attribute between at least two products recognized in an image and to display a comparison result through labeling of the comparison result on the corresponding image. According to some example embodiments, it is possible to provide common features capable of comparing at least two products recognized in an image through a user interface and to mark a comparison result about a feature selected through the user interface on the corresponding image.

The systems or the apparatuses described herein may be implemented using hardware components, software components, and/or a combination thereof. For example, a processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

The foregoing embodiments are merely examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A product comparison method implemented by a computer apparatus including at least one processor, the product comparison method comprising:
   recognizing at least two comparable products from at least one image that is displayed on a same display screen;
   in response to identifying that each of the at least two comparable products has a metadata field corresponding to at least one common attribute, and the metadata field has a numerical value, displaying the at least one common attribute of the at least two comparable products through a user interface, wherein the least one common attribute comprises a first common attribute and a second common attribute, and the least one common attribute is displayed to relatively compare the at least two comparable products with regard to the least one common attribute; and
   based on the user interface receiving a user input that selects one of the at least one common attribute including the first common attribute and the second common attribute as a selected common attribute, providing a result of relative comparison between the at least two comparable products with regard to the selected common attribute.

2. The product comparison method of claim 1, wherein the displaying comprises identifying the at least one common attribute of the at least two comparable products based on metadata of the at least two comparable products.

3. The product comparison method of claim 1, wherein the displaying comprises:
   retrieving metadata of the at least two comparable products from a product database that stores product information; and
   identifying the at least one common attribute of the at least two comparable products based on the retrieved metadata.

4. The product comparison method of claim 1, wherein the displaying comprises:
   retrieving metadata from product details acquired through a real-time search for the at least two comparable products; and
   identifying the at least one common attribute of the at least two comparable products based on the retrieved metadata.

5. The product comparison method of claim 1, wherein the at least two comparable products comprise a first product and a second product, and
   wherein the displaying further comprises:
   displaying the first product and the second product in a first region of the display screen;
   displaying, in a second region of the display screen, the first common attribute and the second common attribute in relative terms indicating that the at least two comparable products are relatively compared with regard to the first common attribute and the second common attribute,
   wherein the providing comprises:
   in response to the first common attribute being selected from the second region of the display screen, marking the first product in the first region of the display screen based on relative comparison of field values of the first common attribute of each of the first product and the second product; and
   in response to the second common attribute being selected from the second region of the display screen, marking the second product in the first region of the display screen based on the relative comparison of field values of the second common attribute of each of the first product and the second product.

6. The product comparison method of claim 1, wherein the providing comprises:
   marking a graphic object corresponding to one of the at least two comparable products with a label according to the result of the relative comparison by overlaying the label on the at least one image, and
   wherein the marking comprises differentially displaying the label based on a field value of at least one of the at least two comparable products about the selected common attribute.

7. The product comparison method of claim 1, wherein the at least two comparable products comprise a first product and a second product,
   wherein the product comparison method further comprises:
   extracting from a metadata field database, first field information of each of the first product and the second product at a first field depth;
   in response to the first field information of the first product being equal to the first field information of the second product at the first field depth, extracting from the metadata field database, second field information of each of the first product and the second product at a second field depth; and
   in response to the second field information of the first product being different from the second field information of the second product, using the second field information as the at least one common attribute, and providing the result of the relative comparison between the at least two comparable products based on comparison between the second field information of the first product and the second field information of the second product at the second field depth.

8. The product comparison method of claim 1, further comprising:
   providing the result of the relative comparison in a graph form based on field values of the at least two comparable products with regard to the selected common attribute.

9. The product comparison method of claim 1, wherein the recognizing the at least two comparable products comprises:
   providing product information of each of a plurality of objects that are recognized in the at least one image; and
   setting at least two objects of the plurality of objects as the at least two comparable products in response to a user input that confirms the product information of the at least two objects.

10. The product comparison method of claim 1, wherein the at least two comparable products comprises a first product and a second product, and wherein the production comparison method comprises:
   extracting from the at least one image, first text corresponding to the first product and second text corresponding to the second product, through an optical character reader (OCR); and comparing the first text with the second text to provide the result of the relative comparison.

11. A non-transitory computer-readable record medium storing instructions that, when executed by at least one processor, cause the at least one processor to perform a product comparison method comprising:

recognizing at least two comparable products from at least one image that is displayed on a same display screen;

in response to identifying that each of the at least two comparable products has a metadata field corresponding to at least one common attribute, and the metadata field has a numerical value, displaying the at least one common attribute of the at least two comparable products through a user interface, wherein the least one common attribute comprises a first common attribute and a second common attribute, and the least one common attribute is displayed to relatively compare the at least two comparable products with regard to the least one common attribute; and based on the user interface receiving a user input that selects one of the at least one common attribute including the first common attribute and the second common attribute as a selected common attribute, providing a result of relative comparison between the at least two comparable products with regard to the selected common attribute.

12. A computer apparatus comprising:
at least one memory configured to store computer-readable instructions; and
at least one processor configured to execute the computer-readable instructions to:
identify at least two comparable products from at least one image in response to each of the at least two comparable products having a metadata field that corresponds to at least one common attribute, and the metadata field having a numerical value;
provide the at least one common attribute of the at least two comparable products through a user interface, wherein the least one common attribute comprises a first common attribute and a second common attribute, and the least one common attribute is displayed to relatively compare the at least two comparable products with regard to the least one common attribute; and
based on the user interface receiving a user input that selects one of the at least one common attribute including the first common attribute and the second common attribute as a selected common attribute, provide a result of relative comparison between the at least two comparable products with regard to the selected common attribute.

13. The computer apparatus of claim 12, wherein the at least one processor is further configured to execute the computer-readable instructions to:
identify the at least one common attribute of the at least two comparable products based on metadata of the at least two comparable products.

14. The computer apparatus of claim 12, wherein the at least one processor is further configured to execute the computer-readable instructions to:

retrieve metadata of the at least two comparable products from a product database, and
identify the at least one common attribute of the at least two comparable products based on the retrieved metadata.

15. The computer apparatus of claim 12, wherein the at least one processor is further configured to execute the computer-readable instructions to:
retrieve metadata from product details acquired through a real-time search for the at least two comparable products; and
identify the at least one common attribute of the at least two comparable products based on the retrieved metadata.

16. The computer apparatus of claim 13, wherein the at least one processor is further configured to execute the computer-readable instructions to:
identify field values of the at least two comparable products with regard to the at least one common attribute.

17. The computer apparatus of claim 13, wherein the at least one processor is further configured to execute the computer-readable instructions to:
differentially display a label in the at least one image based on a field value of at least one of the at least two comparable products about the selected common attribute.

18. The computer apparatus of claim 13, wherein the at least one processor is further configured to execute the computer-readable instructions to:
provide the result of the at least two comparable products in a graph form based on field values of the at least two comparable products about the selected common attribute.

19. The computer apparatus of claim 12, wherein the at least one processor is further configured to execute the computer-readable instructions to:
provide product information of each of a plurality of objects that are recognized in the at least one image, and
set at least two objects of the plurality of objects as the at least two comparable products in response to a user input that confirms the product information of the at least two objects.

20. The computer apparatus of claim 12, wherein the at least two comparable products comprises a first product and a second product, and
wherein the at least one processor is further configured to execute the computer-readable instructions to:
extract from the at least one image, first text corresponding to the first product and second text corresponding to the second product, through an optical character reader (OCR); and
compare the first text with the second text to provide the result of the relative comparison.

* * * * *

UNITED STATES PATENT AND TRADEMARK OFFICE
CERTIFICATE OF CORRECTION

| | |
|---|---|
| PATENT NO. | : 11,636,148 B2 |
| APPLICATION NO. | : 17/204454 |
| DATED | : April 25, 2023 |
| INVENTOR(S) | : Yei Won Choi |

It is certified that error appears in the above-identified patent and that said Letters Patent is hereby corrected as shown below:

On the Title Page

(73) Assignee; Please replace "Line Plus Cornoration" with -- Line Plus Corporation --

Signed and Sealed this
First Day of August, 2023

Katherine Kelly Vidal
*Director of the United States Patent and Trademark Office*